United States Patent
Namazue et al.

(10) Patent No.: US 6,866,431 B2
(45) Date of Patent: Mar. 15, 2005

(54) LIGHT AMOUNT ADJUSTMENT APPARATUS, MANUFACTURING METHOD, AND PHOTOGRAPHING APPARATUS

(75) Inventors: Eriko Namazue, Tokyo (JP); Ichiro Onuki, Kanagawa (JP); Takeshi Miyazaki, Kanagawa (JP); Masataka Yashima, Tokyo (JP); Akio Kashiwazaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/367,764

(22) Filed: Feb. 19, 2003

(65) Prior Publication Data

US 2003/0161626 A1 Aug. 28, 2003

(30) Foreign Application Priority Data

Feb. 19, 2002 (JP) ........................................ 2002-041621

(51) Int. Cl.[7] .............................. G03B 9/08; G03B 9/02; G03B 7/00; G03B 5/22; G03B 5/00
(52) U.S. Cl. ...................... 396/450; 396/505; 359/888; 359/889; 359/894; 348/362
(58) Field of Search ................................ 396/505, 450, 396/508, 449, 451, 507, 452, 456, 460, 485; 359/888, 889, 893, 233, 894, 558, 562, 41, 43, 72, 582, 586, 588, 359; 348/221.1, 362, 335, 342, 363–366, 221

(56) References Cited

U.S. PATENT DOCUMENTS 4,047,212 A * 9/1977 Yamada ...................... 396/505
5,479,298 A * 12/1995 Yanagi et al. ............... 359/888
5,585,884 A   12/1996 Onuki .......................... 396/51
5,725,959 A    3/1998 Terada et al. ............... 428/448
6,046,768 A    4/2000 Kaneda et al. .............. 348/208

FOREIGN PATENT DOCUMENTS

| JP | 6-95208 | 4/1994 |
| JP | 6-273601 | 9/1994 |
| JP | 7-104343 | 4/1995 |
| JP | 11-15042 | 1/1999 |

* cited by examiner

Primary Examiner—Judy Nguyen
Assistant Examiner—Rochelle Blackman
(74) Attorney, Agent, or Firm—Fitzpatrick, Cella, Harper & Scinto

(57) ABSTRACT

There is disclosed a light amount adjustment apparatus for adjusting a state of a flux passed through an aperture having a predetermined aperture diameter, the apparatus comprising: a light amount adjustment member in which a first region having a predetermined transmittance to the flux and a second region for blocking the flux are disposed on the same base material. In the light amount adjustment apparatus, although an optical filter is integrally constituted with a diaphragm blade, there is little positional shift of an ND filter, a shape of the ND filter has a degree of freedom, deterioration of resolution of an image is improved for use in optical apparatuses such as a photographing apparatus, optical properties are superior, the whole apparatus can be miniaturized, and cost reduction of a product can be achieved.

14 Claims, 12 Drawing Sheets

FIG.5A
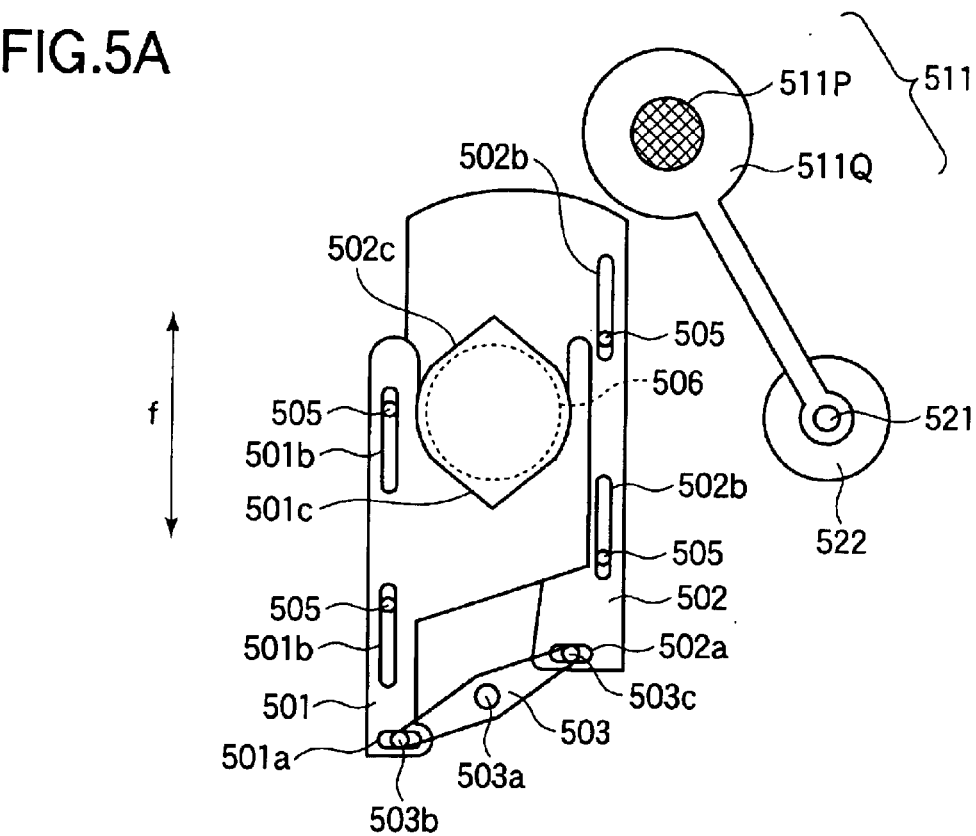
FIG.5BA
FIG.5BB
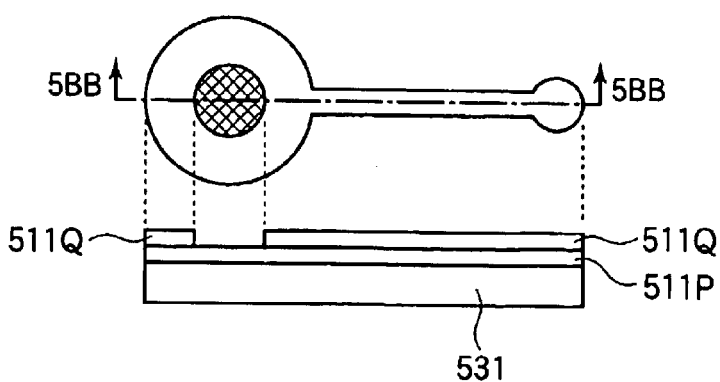

LIGHT AMOUNT ADJUSTMENT APPARATUS, MANUFACTURING METHOD, AND PHOTOGRAPHING APPARATUS

BACKGROUND OF THE INVENTION

1. Field of the Invention

The present invention relates to a light amount adjustment apparatus for use in optical apparatuses such as a photographing apparatus, a manufacturing method of the apparatus, and such a photographing apparatus, particularly to a diaphragm apparatus which is a light amount adjustment member and in which an optical filter is integrally disposed in a so-called diaphragm blade.

2. Related Background Art

In a related-art diaphragm apparatus, a diaphragm blade which is a light amount adjustment member is used to adjust a passed light amount. Moreover, particularly with respect to a high-luminance subject, a diaphragm diameter is not reduced very excessively and is set to a constant diaphragm diameter to prevent a resolving power from being deteriorated by diffraction. Instead, optical filters such as a neutral density filter (hereinafter abbreviated as the ND filter) are used to limit the passed light amount, and thereby an image quality is prevented from being deteriorated.

Concretely, various diaphragm apparatuses have been proposed in which the ND filter is not attached to the diaphragm blade and which are constituted to have an optical function in an independent state. Alternatively, the diaphragm blade is provided with the ND filter by attaching the ND filter which is a member separate from the diaphragm blade to a part of the diaphragm blade with an adhesive. In this constitution, when the subject has a high luminance, the diaphragm diameter is not reduced very excessively, and an diaphragm aperture is maintained at a constant size. Instead, the passed light amount is limited so that the ND filter is positioned on an optical axis.

However, with the diaphragm blade constituted to be a member separate from the ND filter, there are disadvantages that positional shift is generated during the attaching of the ND filter to the diaphragm blade and there is no degree of freedom in the shape of the ND filter. Therefore, for a purpose of improving this, a diaphragm apparatus has been proposed in which the diaphragm blade is constituted integrally with the ND filter (see Japanese Patent Application Laid-Open No. 07-104343) The constitution is shown in FIG. 10.

In FIG. 10, reference numeral 903 denotes a diaphragm blade driving lever which is attached to a shaft of a motor (not shown) via a hole 903a and which can reciprocate/rotate centering on the hole 903a. Reference numerals 901 and 902 denote first and second diaphragm blades including grooves 901a and 902a into which projecting pins 903b and 903c on opposite ends of the diaphragm blade driving lever 903 are fitted so as to be relatively slidable. Reference numerals 901c and 902c denote aperture edges of the diaphragm blades. Reference numerals 904a and 904b are ND filters which are integrally constituted of the same members as those of the diaphragm blades 901 and 902 in the present invention. That is, the ND filters 904a and 904b are constituted so as to have a constant transmittance, and light is blocked in another region.

Moreover, the diaphragm blades 901 and 902 are moved in directions reverse to each other along an arrow f direction, when the diaphragm blade driving lever 903 reciprocates/rotates centering on the hole 903a. As a result, the ND filters 904a and 904b close/open a light path hole 906 formed through a base plate (not shown). That is, when the ND filters 904a and 904b are positioned in the light path hole 906, the passed light amount is attenuated, and the light amount incident upon an image pickup device (not shown) is adjusted. It is to be noted that in edges of the diaphragm blades 901 and 902, grooves 901b and 902b are formed in parallel to a movement direction of these blades. Guide pins 905 projecting from the base plate (not shown) are inserted in these grooves so that the pins can slide with respect to one another.

However, the above-described related art has a room for improvement as follows. That is, in Japanese Patent Application Laid-Open No. 07-104343, the constitution in which the diaphragm blade is constituted integrally with the ND filter is disclosed. It is also disclosed that a silver halide photosensitive material (silver halide film) is used as the material of the diaphragm blade. However, a detailed manufacturing method is not disclosed. Moreover, according to the present inventors' study, with the use of the silver halide film in the material forming the ND filter, a light flux passed through the film is largely scattered, and therefore there is a problem that the resolution of the image is deteriorated.

SUMMARY OF THE INVENTION

Therefore, an object of the present invention is to provide a light amount adjustment apparatus which is used in a photographing apparatus to adjust a state of a flux passed through an aperture having a predetermined aperture diameter. The light amount adjustment apparatus has a light amount adjustment member. In the member, disadvantages are improved such as generation of positional shift of an ND filter and a shape of the ND filter having little degree of freedom despite of an unitary constitution of an optical filter with a diaphragm blade. Additionally, resolution of an image is improved for use in optical apparatuses such as the photographing apparatus. Moreover, the present invention can provide a light amount adjustment apparatus which can entirely be miniaturized and which has achieved cost reduction of a product with a simple constitution.

The above-described objects are achieved by the present invention as follows. That is, according to an aspect of the present invention, there is provided a light amount adjustment apparatus for adjusting a state of a flux passed through an aperture having a predetermined aperture diameter, the apparatus comprising; a light amount adjustment member in which a first region having a predetermined transmittance to the flux and a second region for blocking the flux are disposed on a same base material, both the first and second regions having a coat film comprising a color material formed with a micro liquid droplet discharge apparatus. Moreover, according to the present aspect, there is provided a light amount adjustment apparatus in which a light amount adjustment member superior in optical properties can be manufactured in one step and which achieves a further cost reduction of the product.

Furthermore, according to another aspect of the present invention, there is provided a light amount adjustment apparatus for adjusting a state of a flux passed through an aperture having a predetermined aperture diameter, the apparatus comprising; a light amount adjustment member in which a first region having a predetermined transmittance to the flux and a second region for blocking the flux are disposed on a same base material, the first and second regions being formed by coat films formed of different materials.

Additionally, examples of the preferred aspect include the following. Any one of the above-described constitutions includes: (1) the light amount adjustment apparatus in which a film thickness of the first and second regions of the light amount adjustment member does not largely change and is substantially constant; (2) the light amount adjustment apparatus in which the predetermined transmittance in the first region is constant or changes in a phased or continuous manner; (3) the light amount adjustment apparatus in which the transmittance of the second region of the light amount adjustment member is 1% or less; and (4) the light amount adjustment apparatus in which the light amount adjustment member comprises a driven portion.

Moreover, according to another aspect of the present invention, there is provided (5) a photographing apparatus comprising: the light amount adjustment apparatus comprising any one of the above-described constitutions; a photographing optical system which forms a subject image; image pickup means for photoelectrically converting the subject image; and recording means for recording a photoelectrically converted signal, the light amount adjustment apparatus being disposed in the photographing optical system.

Furthermore, according to another aspect of the present invention, there is provided (6) a manufacturing method of a light amount adjustment apparatus comprising a light amount adjustment member in which a first region having a predetermined transmittance to a flux and a second region for blocking the flux are disposed on a same base material, the method comprising: i) forming a coat film comprising a color material for forming the first region on the base material; and ii) forming a coat film comprising a color material for forming the second region on the base material.

Additionally, the preferred aspect includes the following. Examples of the manufacturing method constituted as described above includes: (7) the manufacturing method of the light amount adjustment apparatus in which the steps i) and ii) are performed by supplying a coloring solution with a micro liquid droplet discharge apparatus; (8) the manufacturing method of the light amount adjustment apparatus for forming the coat film including the color material on the base material so that the predetermined transmittance in the first region is constant or changes in a phased or continuous manner; and (9) the manufacturing method of the light amount adjustment apparatus in which a density of the color material forming the coat film on the base material is determined so that the transmittance of the second region of the light amount adjustment member is 1% or less.

BRIEF DESCRIPTION OF THE DRAWINGS

FIGS. 5A, 5BA and 5BB are a top plan view and sectional view of the light amount adjustment apparatus and light amount adjustment member according to the second embodiment of the present invention;

DESCRIPTION OF THE PREFERRED EMBODIMENTS

The present invention will further concretely be described hereinafter in accordance with embodiments, but the present invention is not limited to these embodiments.

(First Embodiment)

Figure 1A:
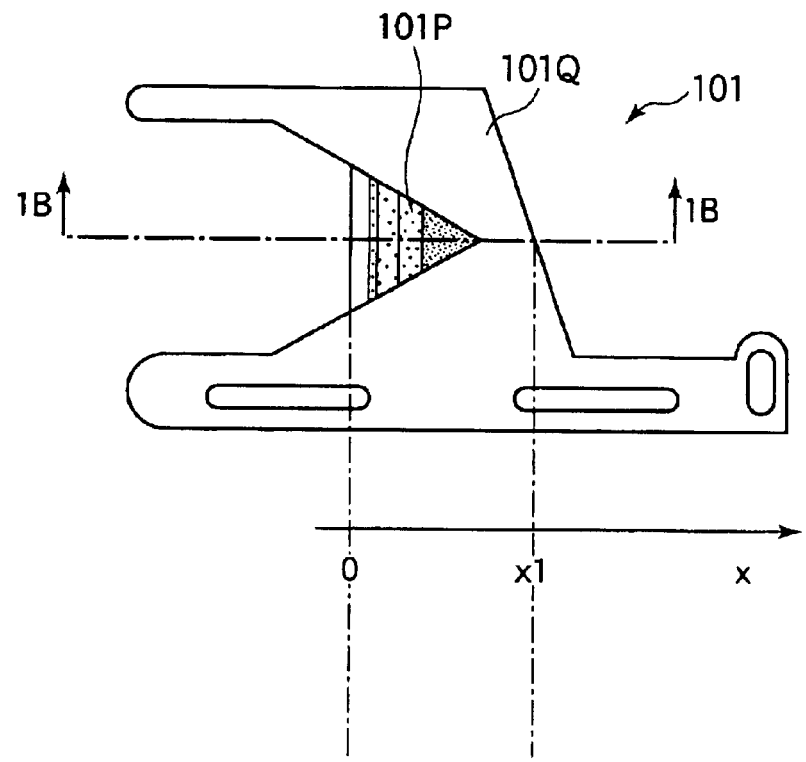
FIGS. 1A and 1B are a top plan view and sectional view of a light amount adjustment member of a light amount adjustment apparatus according to a first embodiment of the present invention.

FIG. 1A is a schematic diagram showing a light amount adjustment member for use in a light amount adjustment apparatus according to a first embodiment of the present invention. It is to be noted that in the present embodiment a diaphragm apparatus for use in e.g. a video camera will be described as an example of the light amount adjustment apparatus.

In FIG. 1A, reference numeral 101 denotes the whole diaphragm blade which is a light amount adjustment member. The diaphragm blade includes: an ND filter portion 101P (gradation portion of FIG. 1A) which is a first region having a predetermined transmittance to a flux; and a light shield portion 101Q (portion other than gradation) which is a second region for blocking the flux. The diaphragm blade of the present embodiment is characterized in that the ND filter portion 101P as the first region and the light shield portion 101Q as the second region are formed on the same base material. It is to be noted that in FIG. 1A the light shield portion 101Q is not colored to clarify a boundary with the ND filter portion 101P. However, the light shield portion is actually a member which blocks light, and is therefore formed in black.

Figure 1B:
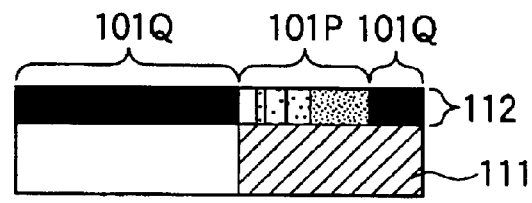

A method of manufacturing the light amount adjustment member including the above-described constitution will be described hereinafter. FIG. 1B is a side view of the member cut along 1B—1B in FIG. 1A and viewed in an arrow direction, and the method will be described with reference to FIG. 1B. In the present embodiment, a transparent base material including an ink-receiving layer of a coloring solution on the surface was used as the base material. First, a transparent base material 111 is coated with a material which can accept the coloring solution to form the ink-receiving layer of the coloring solution. This method will be described hereinafter.

In the present invention, a transparent base material is preferably used, but the transparent base material is not especially limited as long as the material has necessary properties such as mechanical strength and optical properties of the light amount adjustment member. Concretely, examples of the material include a transparent film formed of polyethylene terephthalate (hereinafter abbreviated as PET), diacetate, triacetate, polypropylene or the like. Moreover, a glass base material can also be used as long as the above-described necessary properties are satisfied. In the present embodiment. PET film having a thickness of 75 $\mu$m was used as the transparent base material.

As a method of coating the above-described transparent base material with a material which can accept the coloring solution (obtained by mixing the color material described later into a solvent), the following method can be used. First, the material which can accept the coloring solution is dissolved or dispersed in water or appropriate organic solvents such as alcohol, polyvalent alcohols or other organic solvents together with other additives if necessary, so that a coating solution is prepared. Subsequently, the surface of the transparent base material is coated with the coating solution obtained in this manner, for example, by a roll coater method, a spin coat method or the like. Thereafter, for example, a hot air drying furnace, heat drum, hot plate or the like is used to dry the material and to form a layer (ink-receiving layer) 112 which can accept the coloring solution on the transparent base material.

A material which can be used in forming the ink-receiving layer 112 as described above is not especially limited, as long as the coloring solution is absorbed in a coat layer formed on the transparent base material and the color material in the coloring solution can be fixed in the layer. Examples of the material include polyvinyl alcohol, modified material of cellulose, synthetic resins such as polyester, and natural resins such as gelatine. Moreover, the additive can be used in the ink-receiving layer together with these materials, and is added for a purpose of controlling a coating property and absorption capability of the coloring solution and improving mechanical properties. Examples of the additive include various types of surface-active agents, crosslinking agents, dyestuff fixing agents (anti-hydration agents), defoaming agents, antioxidants, viscosity adjusting agents, pH adjusting agents, mold preventive agents, and plasticizers.

In the present embodiment, the ink-receiving layer 112 was formed as follows. The method comprised: using a wire bar to coat the transparent base material with a coating solution obtained by preparing an aqueous solution containing 10 parts of polyvinyl alcohol (Gohsenol GM-14L manufactured by the Nippon Synthetic Chemical Industry Co., Ltd.) in terms of a solid content; and drying the material by a hot air drying oven on conditions of 100° C. and five minutes. The thickness of the ink-receiving layer 112 capable of absorbing/accepting the coloring solution, prepared in this manner, was 7 $\mu$m.

Subsequently, on the transparent base material 111 in which the ink-receiving layer 112 is formed as described above, the ND filter portion 101P which is the first region and the light shield portion 101Q which is the second region are formed.

In the present embodiment, by a method using a micro liquid droplet discharge apparatus, the ND filter portion 101P as the first region and the light shield portion 101Q as the second region were formed in one stage as follows. At this time, a coloring solution which can be discharged by the micro liquid droplet discharge apparatus is preferably used. As the coloring solution, a water-based solution and oil-based solution can both be used. However, from a respect of discharge reliability, the water-based coloring solution is preferably used. However, the solution is not especially limited to the water-based coloring solution. Furthermore, as the color material in the coloring solution, various types of dyestuffs and pigments can be used, but various types of metals and inorganic/organic fine particles can also be used.

It is to be noted that in the present invention the color material broadly means a material for controlling the transmittance of lights, having a predetermined wavelength band, including visible, ultraviolet, and infrared lights. In the manufacturing of the ND filter portion in the present embodiment, a material is used which gives a uniform transmission property over a whole visible light band, but the present invention is not limited to this material. For example, a material which transmits only a specific wavelength of an infrared region is used in the light amount adjustment apparatus for an infrared camera, and this material is also included in the color material. Moreover, materials in which absorption of light in controlling a transmitted light amount occurs the material and on the surface of the material are both included in the color material according to the present invention.

As the solvent in the coloring solution for use as described above, various water-soluble organic solvents such as methyl alcohol can be used as an aqueous medium. Furthermore, various surface-active agents, defoaming agents, and antiseptic agents can be added if necessary in order to form the coloring solution which has a desired physical value.

In the present embodiment, the ND filter portion having a density gradient of transmittance of about 100 to 8% (optical density: O.D.=0 to 1.1) and the light shield portion were prepared. It is to be noted that in the present embodiment the density gradient of the ND filter portion is set to 100 to 8% in terms of transmittance. However, it is possible from a manufacturing aspect to set a transmittance change to 100 to 0%. In the present embodiment, six types of coloring solutions (ink) were used.

In the present embodiment, a recording pitch and ink discharge amount were set to be substantially constant, and the unit pattern was set to 2×2=4 pixels of 1200 dpi. Additionally, in this case, six types of inks in total were used including one-type of ink (ink 1) not including the color material and five types of inks including the color material having a function of attenuating the light of the specific wavelength band. As the ink which has the function of attenuating the light of the specific wavelength band, there are five types of inks 2 to 6 with compositions shown in Table 1, which include a black color material and are different in color material density.

Moreover, for the color material for use, it is preferable to use a mixture of several types of dyestuffs, so that a substantially flat spectral transmittance is obtained in the visible light region.

Furthermore, in order to keep the optical properties influenced by the optical thickness and surface roughness of the obtained ND filter portion to be suitable, the liquid droplet volume and shot dot diameter of the coloring solution supplied with the micro liquid droplet discharge apparatus are preferably small. This is because a difference of a local ink-receiving layer thickness by a difference of a supply amount of the coloring solution is reduced. It is preferable that the dot diameter of the coloring solution supplied onto the ink-receiving layer be 1/20 or less of a flux diameter.

TABLE 1

Composition of Ink used in Embodiment 1

(unit: wt %)

|  | Ink 1 | Ink 2 | Ink 3 | Ink 4 | Ink 5 | Ink 6 |
|---|---|---|---|---|---|---|
| Color material: black-based dyestuff Food black 2 | 0 | 0.3 | 0.6 | 1.2 | 2.4 | 4.8 |
| Ethylene glycol | 5 | 5 | 5 | 5 | 5 | 5 |
| Diethylene glycol | 5 | 5 | 5 | 5 | 5 | 5 |
| Isopropyl alcohol | 2 | 2 | 2 | 2 | 2 | 2 |
| Acetylenol EH | 1 | 1 | 1 | 1 | 1 | 1 |
| Ion-exchange water | 87.0 | 86.7 | 86.4 | 85.8 | 84.6 | 82.2 |

Figure 11:
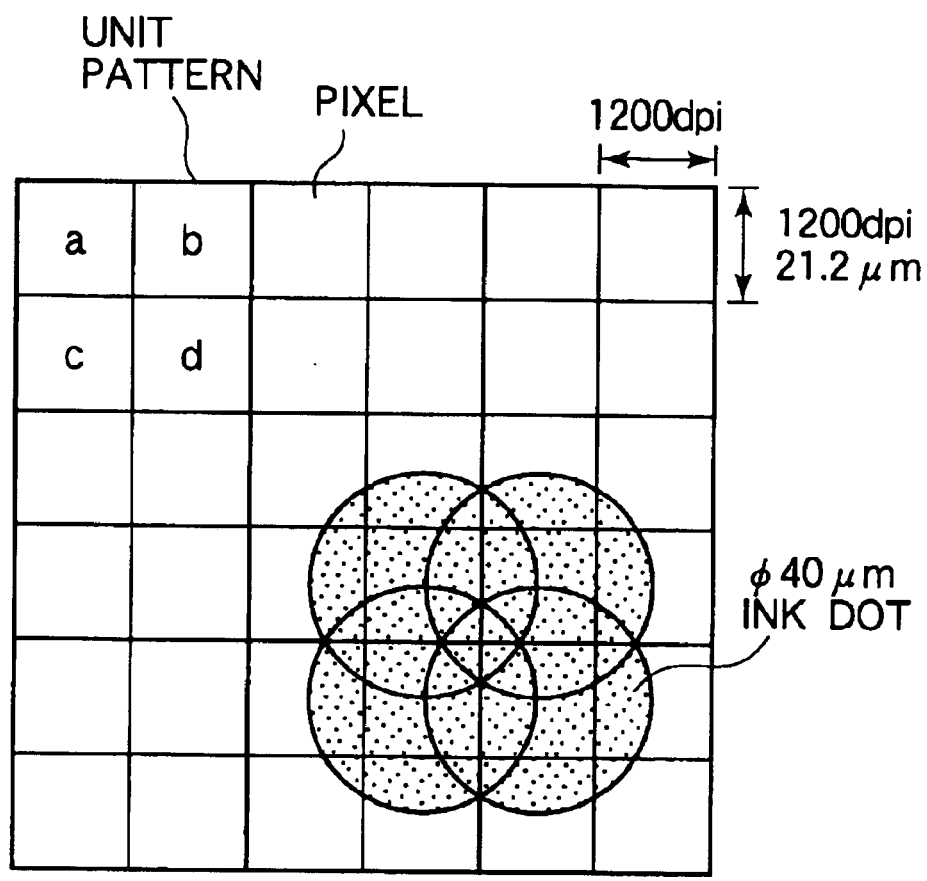
FIG. 11 is an explanatory view of a unit pattern for use in the first embodiment of the present invention.

For a concrete unit pattern of discharge of ink formed in the present embodiment, as shown in FIG. 11, a 21.17 μm (1200 dpi) square is used as one pixel, and four such pixels of 2×2 form the unit pattern. Moreover, the six types of inks are supplied to positions a, b, c, and d of the unit pattern. For the unit pattern, unit patterns 0 to 10 are set as shown in Table 2, and a density level of the unit pattern is used to execute multi-valued processing. The unit patterns 0 to 9 were used to form the first region, and the unit pattern 10 was used to form the second region. It is to be noted that in the present embodiment, in this case, error diffusion processing was used to perform the multi-valued processing. However, the present invention is not especially limited to the error diffusion processing, and methods such as a dither method can also be used.

TABLE 2

Type of Unit Pattern and Density Level

| Unit pattern | Position in unit pattern | | | | Density level (O.D.) |
|---|---|---|---|---|---|
| | a | b | c | d | |
| 0 | — | — | — | — | 0.00 |
| 1 | Ink 1 | Ink 1 | Ink 1 | Ink 1 | 0.06 |
| 2 | Ink 1, Ink 2 | Ink 1 | Ink 1 | Ink 1, Ink 2 | 0.13 |
| 3 | Ink 1, Ink 2 | Ink 2 | Ink 2 | Ink 1, Ink 2 | 0.16 |
| 4 | Ink 2, Ink 3 | Ink 2 | Ink 2 | Ink 2, Ink 3 | 0.25 |
| 5 | Ink 2, Ink 3 | Ink 3 | Ink 3 | Ink 2, Ink 3 | 0.30 |
| 6 | Ink 3, Ink 4 | Ink 3 | Ink 3 | Ink 3, Ink 4 | 0.48 |
| 7 | Ink 3, Ink 4 | Ink 4 | Ink 4 | Ink 3, Ink 4 | 0.58 |
| 8 | Ink 4, Ink 5 | Ink 4 | Ink 4 | Ink 4, Ink 5 | 0.91 |
| 9 | Ink 4, Ink 5 | Ink 5 | Ink 5 | Ink 4, Ink 5 | 1.11 |
| 10 | Ink 5, Ink 6 | Ink 5, Ink 6 | Ink 5, Ink 6 | Ink 5, Ink 6 | 2.52 |

In the present embodiment, the above-described ink was supplied onto the transparent base material coated with the above-described material capable of accepting the ink using the micro liquid droplet discharge apparatus to form the ND filter portion 101P as the first region and the light shield portion 101Q as the second region in one step. This step will be described hereinafter.

Figure 8:
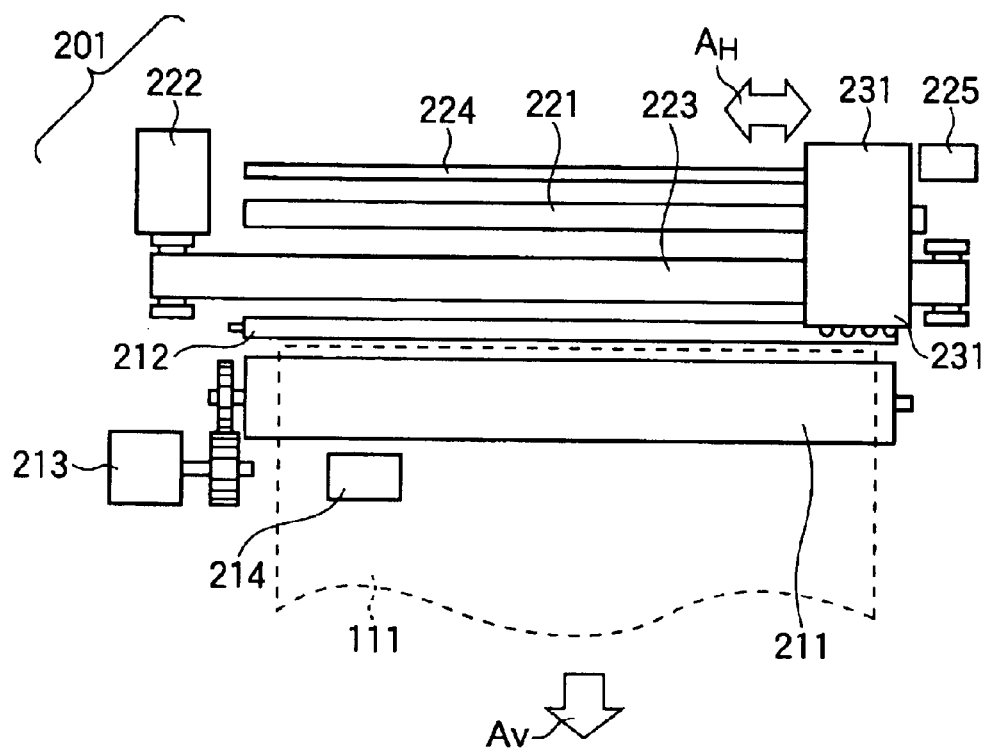
FIG. 8 is a major part structure diagram of a micro liquid droplet discharge apparatus for use in the first embodiment of the present invention.

FIG. 8 shows a structure of a micro liquid droplet discharge apparatus 201 used in the present embodiment. In FIG. 8, the transparent base material 111 is held with a contact pressure on a platen 211 by a pinch roller 212. Moreover, by rotation of the pinch roller 212 accompanying the rotation of a line feed motor 213, the transparent base material 111 is transferred in an arrow A direction. Reference numeral 214 denotes a sheet sensor for detecting whether or not the transparent base material 111 is supplied onto the platen 211.

Reference numeral 231 is a recording head held so that the head can move along a guide shaft 221 in an arrow $A_H$ direction. The recording head 231 is driven along the platen 211 at a constant speed by a carriage motor 222 and a belt 223 extended around the shaft of the motor. The position of the recording head 231 is detected by a linear encoder 224. Reference numeral 225 denotes a home position sensor for detecting whether or not the recording head 231 returns to an original point in the right end. The recording head 231 is formed of a plurality of nozzle units. Moreover, each nozzle unit is filled with a plurality of types of coloring solutions different in concentration. Furthermore, a heater is disposed in the nozzle unit. When power is supplied to the heater, the coloring solution in the nozzle is vaporized, and air bubbles are generated. Moreover, coloring solution droplets are discharged toward the transparent base material 111 by a pressure wave by the air bubbles.

Figure 9:
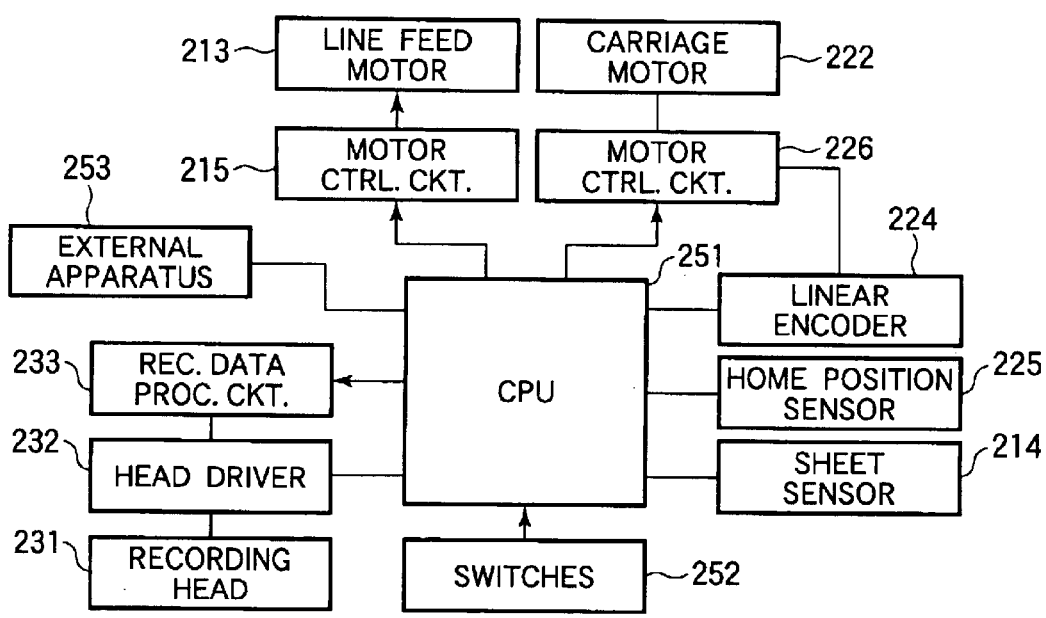
FIG. 9 is a control circuit diagram of the micro liquid droplet discharge apparatus for use in the first embodiment of the present invention.
Figure 10:
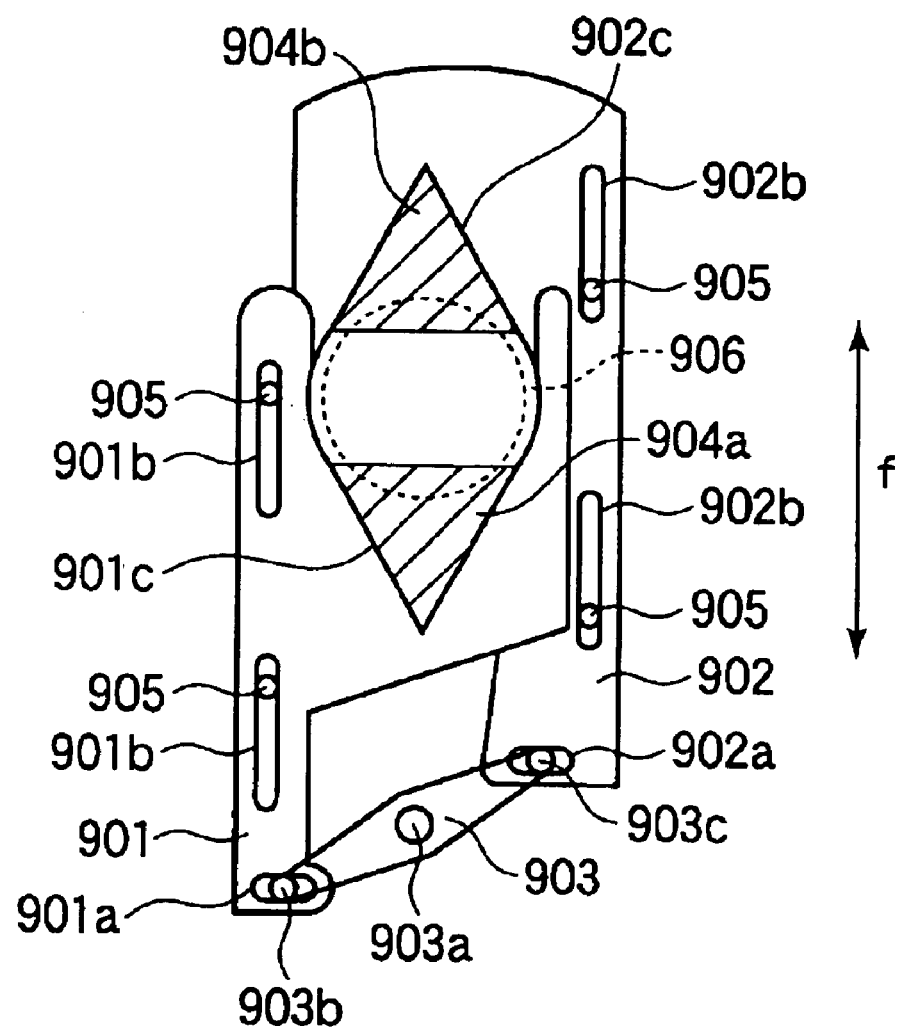
FIG. 10 is a constitution diagram of a related-art diaphragm apparatus.

FIG. 9 is a control circuit diagram of the micro liquid droplet discharge apparatus. In FIG. 9, reference numeral 251 denotes a CPU which controls the operation of the whole micro liquid droplet discharge apparatus, 252 denotes a switch group for instructing power turning-on and printing start, and 253 denotes external apparatuses such as a personal computer (PC) for generating a printing density pattern of the light amount adjustment member.

The line feed motor 213 conveys/controls (sub-scans) the transparent base material 111 via a motor control circuit 215. In this case, the sheet sensor 214 detects the presence/absence of the transparent base material 111, and supplies sheets, when the transparent base material 111 does not exist on the platen. The carriage motor 222 drives/controls (main-scans) the recording head 231 via a motor control circuit 226. Concretely, the carriage motor 222 is a direct-current motor which continuously rotates and which feeds back a position signal from the linear encoder 224 to precisely control a speed and driving amount. The home position sensor 225 detects whether or not the recording head returns to an initial position after end of one main scanning.

Reference numeral 233 denotes a recording data processing circuit for converting density pattern generated by the external apparatus 253 to a discharge pattern of micro liquid droplets. Moreover, a head driver 232 heats/controls the heater in the recording head 231 to discharge the coloring solution based on the signal generated in the circuit 233. As a result, the coloring solution is supplied onto the transparent base material 111, and the pattern having a predetermined density is printed.

In the present invention, after supplying the coloring solution as described above, if necessary, the hot air drying furnace, heat drum, and hot plate are used to dry the material so that the coat film including the color material may be formed. Especially with the cross-linking agent mixed in the material which can absorb the coloring solution, the coat film is effectively heated or irradiated to harden.

Moreover, in the present invention, as described above, the coat film 112 including the color material is formed on the transparent base material 111 constituted as shown in FIGS. 1A and 1B, and the first region 101P and second region 101Q are simultaneously formed. Thereafter, a transparent flatting layer may also be disposed on the colored coat film for a purpose of improving the optical properties.

Figure 12A:
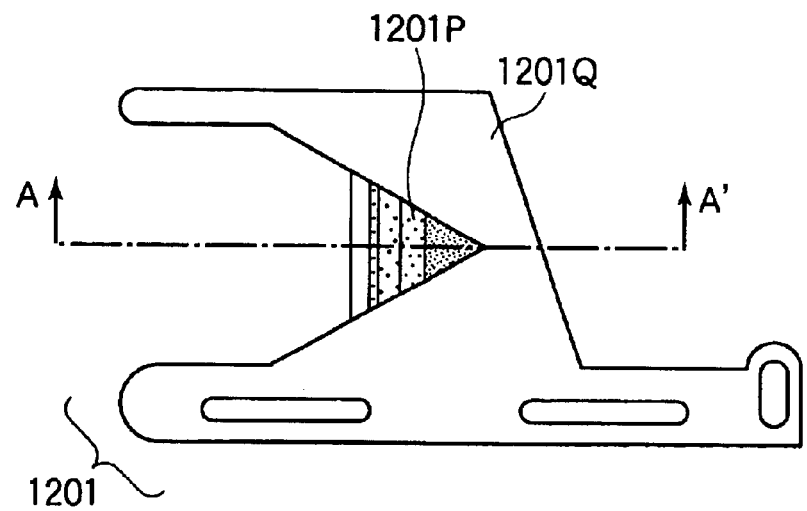
FIGS. 12A and 12B are a top plan view and sectional view of the light amount adjustment member of the light amount adjustment apparatus according to a third embodiment of the present invention.
Figure 12B:
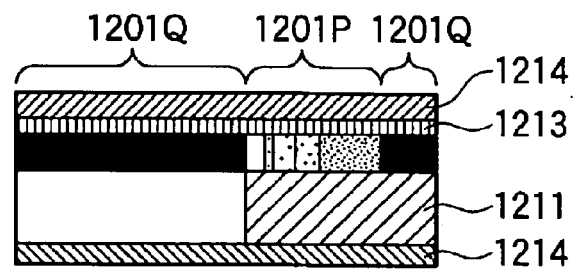

Alternatively, an antireflection film may further be disposed (see FIG. 12B). As a material for use in forming the flatting layer, the above-described material which receives the coloring solution can be used. However, any material can also be used, as long as necessary capabilities such as adhesion to the coat layer, mechanical strength, and optical properties are satisfied. The material is not especially limited.

In the present embodiment, the transparent flatting layer was formed as follows on the colored coat film formed as described above. First, a styrene-butadiene copolymer solution was prepared, the coat film was coated with the copolymer solution using the wire bar, and the film was dried by the hot air drying oven on conditions of 100° C. and five minutes.

As described above, since the micro liquid droplet discharge apparatus is used in the present embodiment, portions forming the ND filter portion 101P as the first region having a predetermined density pattern and light shield portion 101Q as the second region are simultaneously printed/formed on the transparent base material. Furthermore, thereafter, the transparent base material is punched in a press step. Thereby, the diaphragm blade which is the light amount adjustment member formed by integrally forming the ND filter portion 101P and light shield portion 101Q on the transparent base material can easily be manufactured In one step.

Figure 2A:
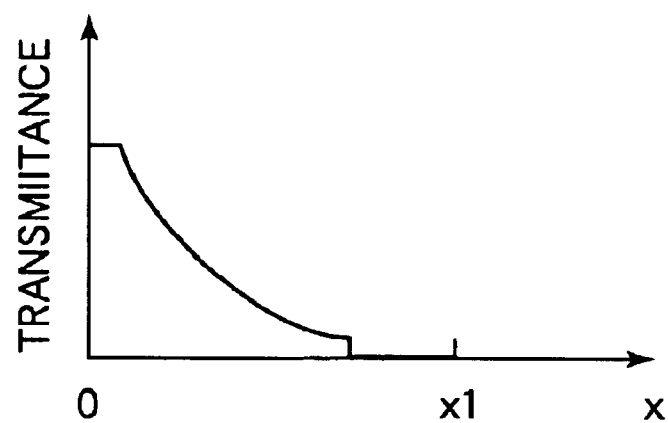
FIGS. 2A and 2B are graphs showing a transmittance distribution and film thickness of the light amount adjustment member for use in the first embodiment of the present invention.
Figure 2B:
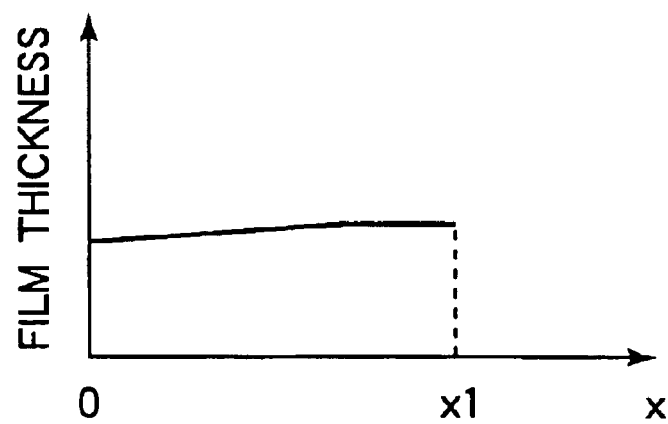

FIGS. 2A and 2B are graphs showing the transmittance and film thickness of portions in points 0 to ×1 shown in FIG. 1A with respect to the diaphragm blade obtained as described above. As a result, as shown in FIGS. 2A and 2B, for the diaphragm blade obtained by the above-described method, the transmittance continuously changes by 100% to 8% in accordance with the position in the ND filter portion 101P. It has also been confirmed that the film thickness is substantially constant without largely changing with the position.

An optical superiority in a case in which the transmittance of the ND filter portion 101P as the first region is changed in the phased or continuous manner is described, for example, in Japanese Patent Application Laid-Open Nos. 6-95208 and 11-15042. Therefore, by the simple manufacturing method described above, the coloring pattern is formed to manufacture the light amount adjustment member so that the transmittance of the ND filter portion 101P as the first region changes in the phased or continuous manner. With the application of the member to the light amount adjustment apparatus, although the simply and economically obtained light amount adjustment member is used, the light amount adjustment apparatus of the present invention is superior in obtaining an effect similar to that of the above-described known art.

The optical properties of the light amount adjustment member prepared as described above for use in the present embodiment will be described hereinafter. First, a most important optical property is transmittance in the second region 101Q which is the light shield portion of the light amount adjustment member. Then, a commercially available optical densitometer was used to measure the optical density (hereinafter abbreviated as O.D.) of the light shield portion, and 2.3 was obtained. A relation between the optical density and transmittance T is represented by the following equation <1>.

$$OD = -\log_{10} T \qquad <1>$$

From the equation <1>, the measured value is converted to the transmittance of 0.5%, and it can be confirmed that the diaphragm blade of the present embodiment has a sufficient capability.

Next, to judge whether or not the first region 101P of the preferable light amount adjustment member, having the predetermined transmittance, in the present invention is satisfactory, it is necessary to evaluate three items: (1) degree of deterioration of an optical capability by scattering or refracting the flux by the color material in a case in which only the first region or ND filter portion 101P is used alone; (2) diffraction preventing effect with the use of the member assembled in the diaphragm apparatus; and (3) spectral transmittance.

Here, for (3), the properties of the filter can freely be adjusted by the type of the color material, the transmittance can easily be measured using a commercially available spectral transmittance meter, and therefore description thereof is omitted. On the other hand, for the evaluation item (2), since the evaluation result is largely influenced by factors such as the shape of the diaphragm blade and diaphragm value (F number) at an evaluation time, the method (1) is appropriate in order to evaluate the optical properties of the ND filter alone prepared only with the first region 101P. Then, the properties of the first region or ND filter portion 101P in the present embodiment were evaluated in the following procedure.

First, the ND filter including the uniform density pattern having an optical density of 0.5 (transmittance of 32%) was prepared in the method of the present embodiment described above. This filter was disposed before a photographing lens of a digital camera Power Shot G1 manufactured by Canon Inc., and resolution chart for an digital still camera of ISO standards was photographed. In an exposure control mode, diaphragm priority AE by full aperture was used, so that appropriate exposure was obtained regardless of the presence/absence of the ND filter. A white/black bar chart (spatial frequency of 14.5 line pairs/mm on an image plane) was cut out from the photographed image, and a difference between white and black portion levels of the image was obtained and used as an evaluation contrast. Subsequently, the filter was removed, the similar photographing was performed, and the difference between the white and black portion levels of the image was obtained and used as a reference contrast. A ratio of the evaluation contrast with respect to the reference contrast was obtained in this manner, and defined as a filter contrast. This value in the above-described ND filter was 0.96.

An allowable lower limit value of the filter contrast differs with a use or price range of a photographing apparatus, but it is known that the value is preferably 0.9 or more in the photographing apparatus of a regular class, and preferably 0.92 or more in a high class. Therefore, it is seen that the filter contrast value of 0.96 of the ND filter obtained as described above indicates a sufficiently high capability. It is to be noted that even the transmittance of the first region changed in the phased or continuous manner can be evaluated in this evaluation method.

Figure 3:
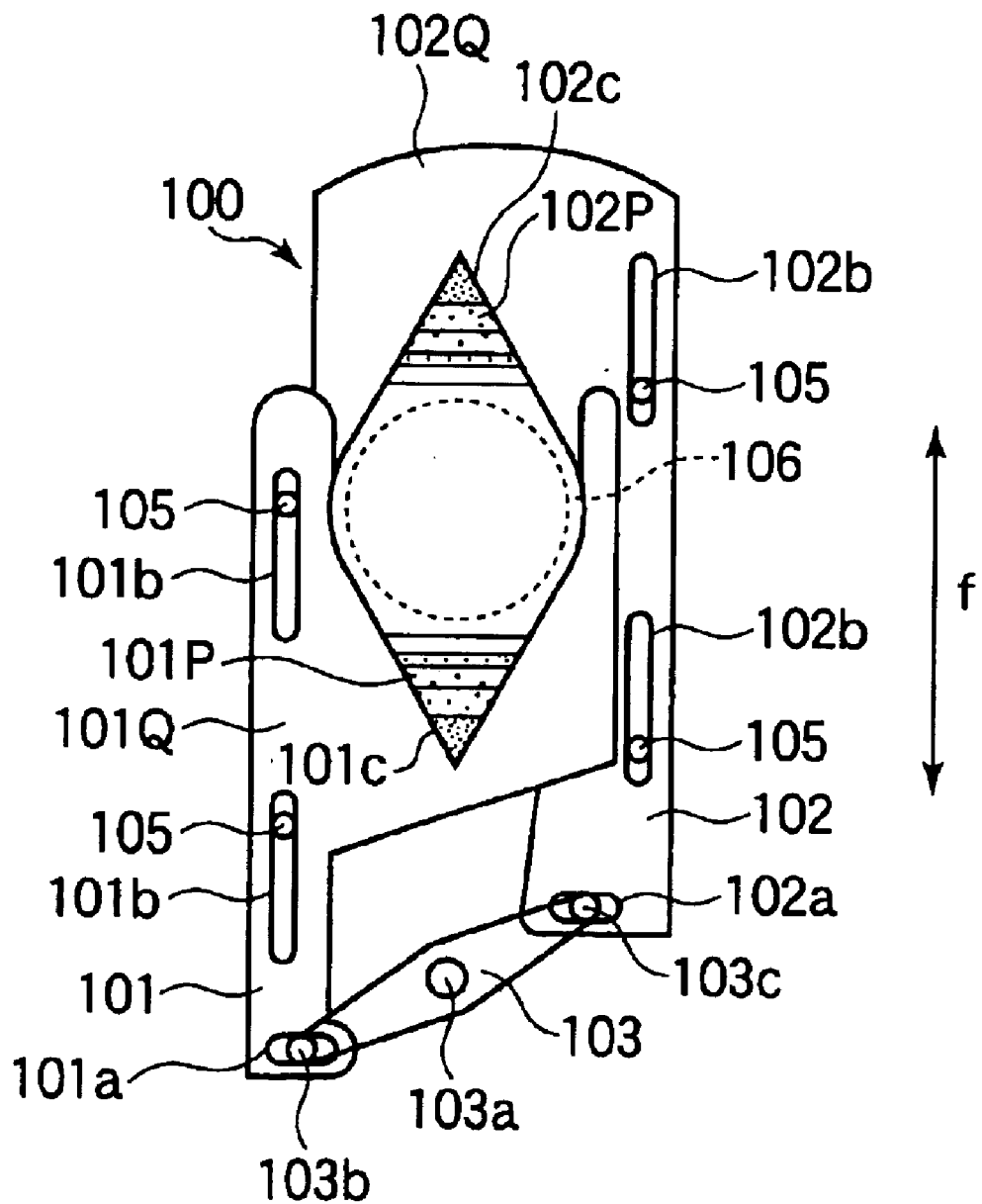
FIG. 3 is a diagram of a diaphragm apparatus using a diaphragm blade according to the first embodiment of the present invention.

FIG. 3 is an explanatory view of the diaphragm apparatus which is the light amount adjustment apparatus using the diaphragm blade of FIGS. 1A and 1B. In FIG. 3, reference numeral 100 denotes the whole light amount adjustment apparatus. Reference numeral 101 denotes a first diaphragm blade shown in FIGS. 1A and 1B, and 102 denotes a second diaphragm blade. The second diaphragm blade 102 is manufactured in the same manner as in the first diaphragm blade 101, and includes an ND filter portion 102P and light shield portion 102Q. Reference numeral 103 denotes a diaphragm blade driving lever which is attached to the shaft of the motor (not shown) via a hole 103a and which is rotated centering on the hole 103a. The first and second diaphragm blades 101 and 102 are engaged with projecting pins 103b and 103c on opposite ends of the diaphragm blade driving lever 103 in groove holes 101a and 102a. Reference numeral 105 denotes guide pins of a base plate (not shown) engaged in grooves 101b and 102b in side edges of the first and second diaphragm blades 101 and 102 so that the pins can slide with respect to the grooves. Reference numeral 106 denotes a light path hole formed through the base plate, and 101c and 102c denote diaphragm aperture edges of the first and second diaphragm blades 101 and 102. It is to be noted that in FIG. 3 the light shield portion 101Q is not colored to clarify the boundary with the ND filter portion 101P. However, the light shield portion is actually the member which blocks light, and is therefore formed in black.

FIG. 3 shows a state at a time when the diaphragm is fully opened. When the diaphragm is narrowed down from the fully opened state, the light path hole 106 as the aperture of the diaphragm is shielded by the ND filter portions 101P and 102P of the first and second diaphragm blades. Therefore, the transmittance of the flux passed through the light path hole 106 gradually decreases. However, in the diaphragm blade of the present embodiment, as described above, the film thickness is substantially constant in all the positions of the diaphragm blade, and therefore the light path difference is not generated in the flux passed through the ND filter portions of the diaphragm blade. Therefore, the deterioration of the resolution by the light path difference of the flux of the aperture 106 can be improved.

Figure 4:
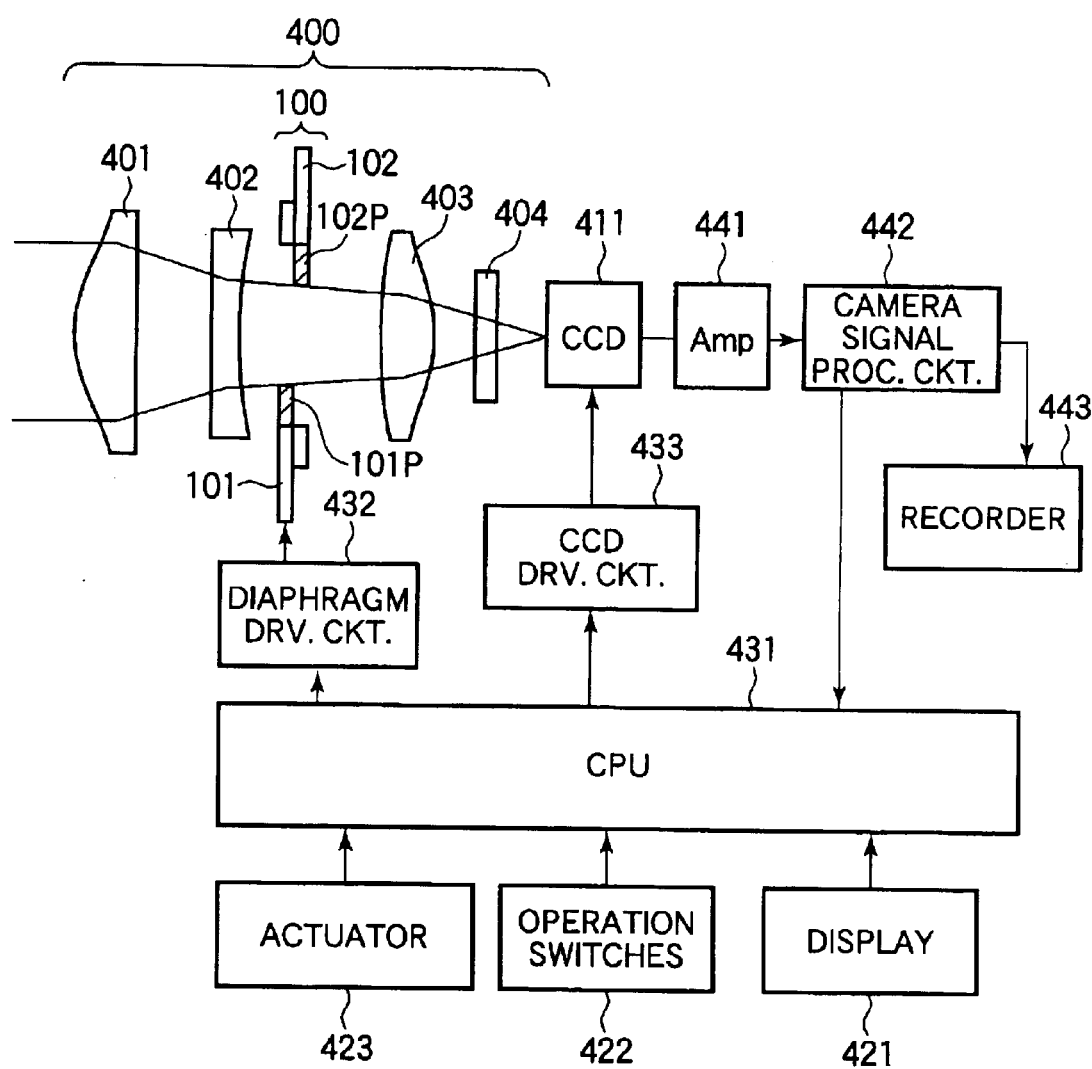
FIG. 4 is a constitution diagram of a photographing apparatus in which a light amount adjustment apparatus according to the first embodiment of the present invention is assembled.

FIG. 4 is a schematic arrangement diagram showing that the diaphragm apparatus shown in FIG. 3 is disposed in the optical apparatus. In the present embodiment, a video camera which is provided with the diaphragm apparatus will be described as an example of the optical apparatus. The apparatus photoelectrically converts a dynamic or stationary image into an electric signal by photographing means to record digital data. Reference numeral 400 is a photographing optical system which includes a plurality of lens groups and which is constituted of a first lens group 401, second lens group 402, third lens group 403, and the diaphragm apparatus 100 shown in FIG. 3. The first lens group 401 is a fixed front ball lens group, 402 is a variater lens group, 403 is a focusing lens group, and 404 denotes an optical low-pass filter. Moreover, image pickup means 411 is disposed in a focal position (assumed image forming plane) of the photographing optical system 400. This means includes photoelectrical conversion means such as a two-dimensional CCD including a plurality of photoelectrical conversion unit for converting a radiated light energy to an electric charge, charge accumulation unit for accumulating the charges, and charge transfer unit for transferring and sending the charges to the outside.

Reference numeral 421 denotes a display such as a liquid crystal display in which a subject image acquired by the image pickup means 411 and operation situation of the optical apparatus are displayed. Reference numeral 422 denotes an operation switch group constituted of a zoom switch, photographing preparation switch, photographing start switch, and photographing condition switch for setting shutter second/hour. An actuator 423 performs focus driving to adjust a focal state of the photographing optical system 400 and to drive other members.

A CPU 431 calculates and judges whether a value of inputted average density agrees with a numeric value corresponding to appropriate exposure stored in an inner memory. When there is a difference, the CPU changes the diaphragm aperture in accordance with an absolute value of the difference with an absolute symbol, or changes a charge accumulation time into the image pickup means 411. When the diaphragm is moved, the diaphragm blade driving lever 103 is rotated centering on the rotation center 103a by a diaphragm driving circuit 432, and thereby the diaphragm blades 101 and 102 vertically slide. Thereby, a size of the light path hole 106 which is the aperture changes. A diaphragm aperture area or charge accumulation time can be changed in this manner to obtain optimum exposure.

The image of the subject formed on the image pickup means 411 in the optimum exposure is converted into the electric signal as a charge amount for each pixel in accordance with a degree of brightness. The signal is amplified in an amplifier circuit 441 and subsequently subjected to predetermined γ correction by a camera signal processing circuit 442. It is to be noted that this processing may also be performed by the processing of the digital signal after A/D conversion. The video signal prepared in this manner is recorded in a recorder 443.

According to the first embodiment, the light amount adjustment member for use in the light amount adjustment apparatus for adjusting the state of the flux passed through the aperture having a predetermined aperture diameter includes the first region having the predetermined transmittance to the flux and second region for blocking the flux on the same base material. Both the first and second region are constituted of the coat films including the color materials formed using the micro liquid droplet discharge apparatus. Therefore, the whole light amount adjustment apparatus can be miniaturized. Moreover, the light amount adjustment member can be manufactured with a simple constitution in one step, and therefore the cost reduction of the product can be achieved. Furthermore, according to the first embodiment, it is possible to easily manufacture the light amount adjustment member which has various density patterns in the first region or which has various shapes.

Moreover, according to the first embodiment, the transmittance changes in the first and second regions, but an equal film thickness is obtained. Therefore, the light path difference of the flux passed through the light amount adjustment member is 0, the resolution can be prevented from being deteriorated by the light path difference, and the resolution can be improved. Furthermore, according to the first embodiment, the light amount adjustment member according to the present invention is assembled in the photographing apparatus and it is therefore possible to obtain the image whose resolution is inhibited from dropping and which does not have any sense of difference.

(Second Embodiment)

FIG. 5A is a schematic diagram of the light amount adjustment apparatus according to a second embodiment of the present invention, and FIGS. 5BA and 5BB show a top plan view and a schematic sectional view of a light amount adjustment member 511. In FIG. 5A, a diaphragm blade driving lever 503 is attached to the shaft of the motor (not shown) via a hole 503a, and can reciprocate/rotate centering on the hole 503a. First and second diaphragm blades 501 and 502 include groove holes 501a and 502a in which projecting pins 503b and 503c on the opposite ends of the diaphragm blade driving lever 503 are fitted so as to be relatively slidable. Reference numerals 501c and 502c are aperture edges of the diaphragm blades. When the diaphragm blade driving lever 503 reciprocates/rotates centering on the hole 503a, the diaphragm blades 501 and 502 are moved in the directions reverse to each other along the direction shown by the arrow f, and close/open a light path hole 506 formed through the base plate (not shown). Grooves 501b and 502b are formed through side edges of the diaphragm blades 501 and 502 to extend in parallel with the movement direction of the blades. Guide pins 505 projecting from the base plate (not shown) are inserted in these grooves so that the pins can slide with respect to one another.

Reference numeral 511 denotes the whole light amount adjustment member according to the second embodiment, 522 denotes driving means of the light amount adjustment member 511, and 521 denotes an output shaft of the driving means for holding the light amount adjustment member 511. When the size of the aperture formed by the aperture edges 501c and 502c of the diaphragm blades 501 and 502 is large, the light amount adjustment member 511 retreats outside the light path as shown in FIG. 5A. Moreover, when the size of the aperture formed by the aperture edges 501c and 502c is reduced to a size immediately before influenced by diffraction, the driving means 522 rotates the light amount adjustment member 511, and closes the aperture formed by the aperture edges 501c and 502c to adjust the light amount.

Next, a method of manufacturing the light amount adjustment member 511 according to the second embodiment will be described. The light amount adjustment member 511 is constituted of an ND filter portion 511P (hatched portion of FIG. 5A) including a first color material for imparting the predetermined transmittance, and a light shield portion 511Q (portion other than the hatched portion) including a second color material for blocking the light. FIG. 5BA is a top plan view of the light amount adjustment member 511, and FIG. 5BB shows a sectional view in 5BB—5BB part of FIG. 5BA.

Figure 6:
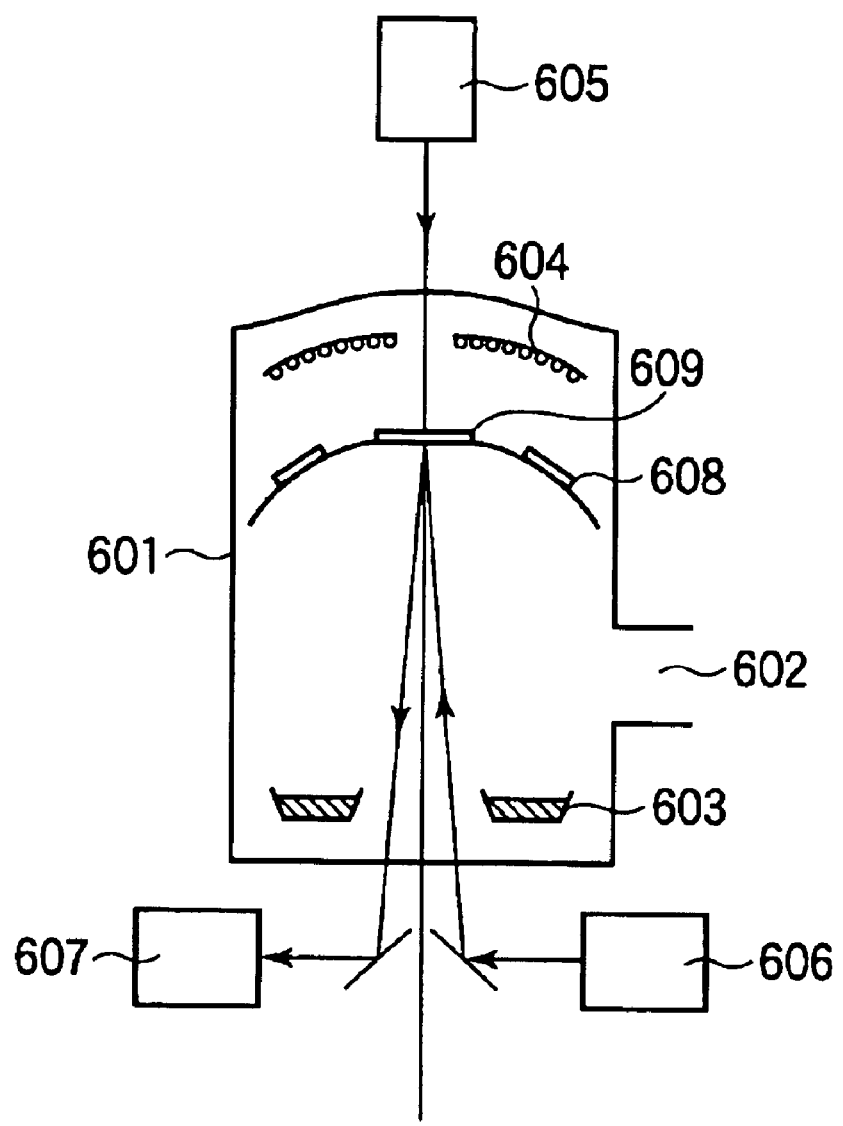
FIG. 6 is a diagram of a vacuum deposition apparatus for use in the second embodiment of the present invention.

In the light amount adjustment member according to the second embodiment, the ND filter portion 511P is a deposited film formed by coloring the color material on the transparent base material by a vapor deposition method. A coloring example with respect to the transparent base material for use in this case will be described with reference to one example of a vacuum deposition apparatus shown in FIG. 6. In FIG. 6, reference numeral 601 denotes a main body of the vacuum apparatus, 602 denotes an exhaust port, 603 denotes an evaporation source of an electronic gun, 604 denotes a heater for heating the base material, 605 denotes a light source for transmission, 606 denotes a light source for reflection, 607 denotes a light receiving portion, 608 denotes a deposited base material, and 609 denotes a monitor for controlling the film thickness.

In the second embodiment, it is preferable to use a translucent base material, particularly a transparent base material as the base material. In general, a film base material formed of a synthetic resin is used, but the material is not limited to the film base material as long as the material has necessary properties such as the mechanical strength and optical properties of the diaphragm blade. The base materials such as a glass base material may also be used. In the present embodiment, a PET film was used.

Materials forming a metal oxide film and dielectric film are used as starting materials for forming the deposited film. These materials are evaporated from the different evaporation sources 603 to alternately form the metal oxide film and dielectric film on the PET film base material 608. Examples of the material of the metal oxide film include $TiO$, $Ti_2O_3$, $Ti_3O_5$, $Ti_4O_7$. These may also be used alone or in a mixture. Furthermore, when a plurality of layers are superposed, different materials may also be used for the respective layers. In the present embodiment, $TiO$ and $Ti_2O_3$ were used. Examples of the material of the dielectric film include $Al_2O_3$, $SiO_2$ and $MgF_2$, and the dielectric film in contact on an air side is preferably $MgF_2$. In the present example, $Al_2O_3$ and $MgF_2$ were used.

When the deposited film is formed, the transmittance of the deposited film depends on the film thickness. Therefore, optical film thickness control apparatuses including the light source for transmission 605 and light receiving portion 607, and including the light source for reflection 606 and light receiving portion 607 were used to control the film thickness by a transmitted light from the monitor for controlling the film thickness 609 disposed on the base material, short-wavelength reflected light, and spectral intensity of the visible range. Thereby, the ND filter portion 511P having a desired film thickness, that is, desired transmittance was formed. In the present embodiment, the film having a thickness of 0.3 to 1.0 $\mu$m was formed.

Figure 7A:
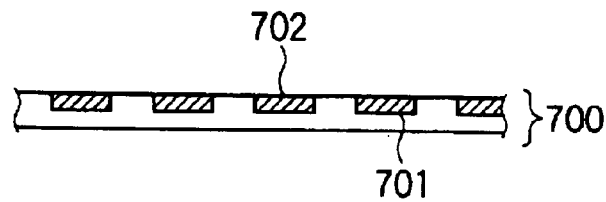
FIGS. 7A, 7B, and 7C are explanatory views of pattern formation (coloring step) in the manufacturing of the light amount adjustment member for use in the second embodiment of the present invention.
Figure 7B:
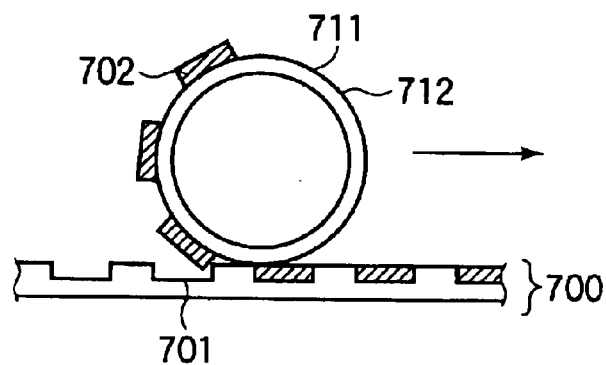
Figure 7C:
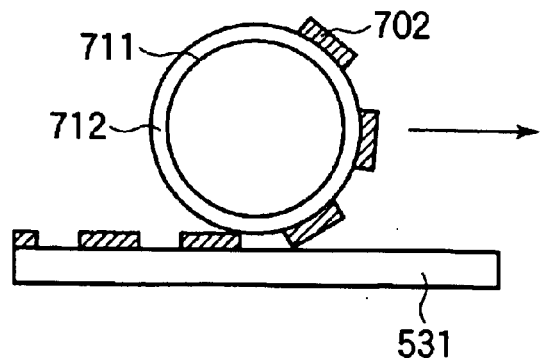

In the light amount adjustment member 511 according to the second embodiment, the light shield portion 511Q is a printed film, and the color material is colored on the transparent base material by a printing method. FIGS. 7A to 7C are explanatory views of a method of coloring the color material on the transparent base material by the printing method, that is, explanatory views concerning pattern printing. The method first comprises: charging an ink 702 which is the color material into a concave portion 701 formed in a predetermined pattern in an intaglio 700 (FIG. 7A). Examples of the ink include black inks such as a carbon black ink. Next, the method comprises: rotating/moving and pressing a blanket shell 712 to which a blanket 711 is attached on the intaglio 700 to transfer the ink 702 in the concave portion 701 onto the blanket shell 712 (FIG. 7B). Subsequently, the ink 702 of the blanket shell 712 is transferred to a base material 531 to form (color) the pattern (FIG. 7C). In the second embodiment, the light shield portion 511Q is formed in a portion shown in FIGS. 5BA and 5BB in this manner. In this case, the density of the ink or the film thickness is controlled so that the transmittance is 1% or less. In the present embodiment, the film having a thickness of 0.8 to 1.5 $\mu$m and transmittance of 1% was formed.

As described above, in the present embodiment, two different coloring steps of the vapor deposition and printing methods were used with respect to the same base material to obtain the base material including the portion colored in two different coloring materials. Thereafter, the base material was punched with a press to manufacture the light amount adjustment member 511 shown in FIGS. 5BA and 5BB.

According to the second embodiment, in the light amount adjustment apparatus in which the state of the flux passed through the aperture having the predetermined aperture diameter is adjusted, the first region for imparting the predetermined transmittance to the flux and the second region for blocking the flux are disposed on the same base material. Moreover, the first and second regions are formed by the coat films formed of different materials. Therefore, the material more suitable for the optical properties of each region can be selected and used, and it is possible to manufacture the light amount adjustment member which is more superior In the optical properties.

It is also possible to prepare the light amount adjustment member which includes the structure similar to that of the first embodiment in the manufacturing method used in the second embodiment. Moreover, conversely, it is also possible to prepare the light amount adjustment member which includes the structure similar to that of the second embodiment in the manufacturing method used in the first embodiment. Furthermore, as described in the first and second embodiments, there are a plurality of manufacturing methods of the light amount adjustment member. However, the combination is not limited to the above-described embodiments, and a plurality of manufacturing methods may also be combined.

(Third Embodiment)

FIGS. 12A and 12B are a schematic view and sectional view of the light amount adjustment member according to a third embodiment of the present invention. In the present embodiment, the light amount adjustment member was obtained as follows. First, in the same manner as in Embodiment 1 or Embodiment 2, portions forming a first region 1201P having a predetermined density pattern and second region 1201Q for blocking the light are formed on the same transparent base material 1211. Next, a transparent resin layer is disposed only on the surface on which these portions are disposed to form a flatting layer 1213. Thereafter, furthermore, in the same manner as in Japanese Patent Application Laid-Open No. 06-273601 by the present applicant, antireflection films 1214 were formed on opposite surfaces (see FIG. 12B). Thereafter, the base material was punched with the press to manufacture a light amount adjustment member 1201.

The antireflection film formed as described above requires properties that a reflection preventive property is superior in a visible light band and a shield property of moisture and hazardous gas is superior. According to the present inventors study, it is preferable to use a deposited multilayered film of an inorganic material in order to satisfy this requirement. The antireflection films formed in the present embodiment include undercoat layers deposited on the opposite surfaces, and multilayered films which are repeated films laminated on the undercoat layers. Concretely, the undercoat layer is a thin film which is formed of a low-refractive-index material with a refractive index n=about 1.5, mainly containing silicon oxide $SiO_x$ ($2>x>1$) having a satisfactory adhesion to the surface and superior resistances to chemicals and wear, and which has a film thickness of about 300 nm. The multilayered film laminated on the undercoat layer includes: a first-layer thin film formed of a high-refractive-index material mainly containing a mixture of titanium oxide $TiO_2$ and zirconium oxide $ZrO_x$; a second-layer thin film formed of a low-refractive-index material mainly containing silicon oxide $SiO_x$ ($2 \geq x \geq 1$); a third-layer thin film formed of the high-refractive-index material mainly containing a mixture of titanium oxide $TiO_2$ and zirconium oxide $ZrO_2$; and a fourth-layer thin film formed of the low-refractive-index material mainly containing silicon oxide $SiO_x$ ($2 \geq x \geq 1$).

The light amount adjustment member 1201 obtained as described above was checked, and it has been confirmed that a stray light by filter surface reflection can be prevented from being generated, more superior optical properties are obtained, moisture and hazardous gas are blocked from the color material, and the color material can be prevented from being deteriorated. Thereby, it has been seen that with the constitution of the present embodiment, the light amount adjustment member superior in resistance to environments, especially in hygroscopic property can be obtained.

As described above, according to the first embodiment, the light amount adjustment apparatus for adjusting the state of the flux passed through the predetermined aperture includes the light amount adjustment member including the first region for imparting the predetermined transmittance to the flux and second region for blocking the flux on the same base material. Both the first and second regions are constituted of the coat films including the color materials formed using the micro liquid droplet discharge apparatus. Therefore, the whole light amount adjustment apparatus can be miniaturized. Moreover, the light amount adjustment member can be manufactured with the simple constitution in one step, and therefore the cost reduction of the product can be achieved. Furthermore, it is possible to easily manufacture the light amount adjustment member which has various modes.

Moreover, according to the present invention, the transmittance changes in the first and second regions, but the substantially equal film thickness can be formed in these regions. Therefore, the light path difference of the flux passed through the light amount adjustment member is 0. When the light amount adjustment member is used, the resolution can be prevented from being deteriorated by the light path difference. As a result, there is provided the photographing apparatus whose resolution is improved.

Furthermore, according to the present invention, the light amount adjustment apparatus in which the state of the flux passed through the aperture having the predetermined aperture diameter is adjusted includes the light amount adjustment member in which the first region for imparting the predetermined transmittance to the flux and the second region for blocking the flux are disposed on the same base material. Moreover, the first and second regions are formed by the coat films formed of different materials. Therefore, the material more suitable for the optical properties of each region can be selected and used, and it is possible to manufacture the light amount adjustment member which is more superior in the optical properties.

What is claimed is:

1. A light amount adjustment apparatus for adjusting a state of a flux passed through an aperture having a predetermined aperture diameter, the apparatus comprising:
   a light amount adjustment member in which a first region having a predetermined transmittance to the flux and a second region for blocking the flux are disposed on a same transparent base material, the first and second regions each having a coat film comprising a color material formed with a micro liquid droplet discharge apparatus,
   wherein a transmittance of the second region of the light amount adjustment member is 1% or less.

2. The light amount adjustment apparatus according to claim 1, wherein a film thickness of the coat film constituting the first and second regions of the light amount adjustment member is substantially constant.

3. The light amount adjustment apparatus according to claim 1, wherein the predetermined transmittance in the first region is constant or changes in a phased or continuous manner.

4. The light amount adjustment apparatus according to claim 1, wherein the light amount adjustment member comprises a driven portion.

5. A photographing apparatus comprising:
   the light amount adjustment apparatus according to claim 1;
   a photographing optical system for forming a subject image;
   image pickup means for photoelectrically converting the subject image; and
   recording means for recording a photoelectrically converted signal, the light amount adjustment apparatus being disposed in the photographing optical system.

6. A light amount adjustment apparatus for adjusting a state of a flux passed through an aperture having a predetermined aperture diameter, the apparatus comprising:
   a light amount adjustment member in which a first region having a predetermined transmittance to the flux and a second region for blocking the flux are disposed on a same transparent base material, the first and second regions being formed by coat films formed of different materials, wherein a transmittance of the second region of the light amount adjustment member is 1% or less.

7. The light amount adjustment apparatus according to claim 6, wherein a film thickness of the first and second regions of the light amount adjustment member is constant.

8. The light amount adjustment apparatus according to claim 6, wherein the predetermined transmittance in the first region is constant or changes in a phased or continuous manner.

9. The light amount adjustment apparatus according to claim 6, wherein the light amount adjustment member comprises a driven portion.

10. A photographing apparatus comprising:

the light amount adjustment apparatus according to claim 6;

a photographing optical system for forming a subject image;

image pickup means for photoelectrically converting the subject image; and recording means for recording a photoelectrically converted signal, the light amount adjustment apparatus being disposed in the photographing optical system.

11. A manufacturing method of a light amount adjustment apparatus comprising a light amount adjustment member in which a first region having a predetermined transmittance to a flux and a second region for blocking the flux are disposed on a same transparent base material, the method comprising steps of:

i) forming a coat film comprising a color material for forming the first region on the base material; and ii) forming a coat film including a color material forming the second region on the base material, wherein a density of the color material forming the coat film on the base material is determined so that the transmittance of the second region of the light amount adjustment member is 1% or less.

12. The manufacturing method of the light amount adjustment apparatus according to claim 11, wherein steps i) and ii) include supplying a coloring solution by a micro liquid droplet discharge apparatus.

13. The manufacturing method of the light amount adjustment apparatus according to claim 11, wherein each of steps i) and ii) is performed by a vapor deposition process or a printing process.

14. The manufacturing method of the light amount adjustment apparatus according to claim 11, wherein the coat film including the color material is formed on the base material so that the predetermined transmittance in the first region is constant or changes in a phased or continuous manner.

* * * * *

UNITED STATES PATENT AND TRADEMARK OFFICE
CERTIFICATE OF CORRECTION

PATENT NO. : 6,866,431 B2
DATED : March 15, 2005
INVENTOR(S) : Eriko Namazue et al.

It is certified that error appears in the above-identified patent and that said Letters Patent is hereby corrected as shown below:

Drawings,
Sheet 2, Fig. 2A, "TRANSMIITANCE" should read -- TRANSMITTANCE --.

Column 1,
Line 36, "an diaphragm" should read -- a diaphragm --.

Column 2,
Line 34, "an unitary" should read -- a unitary --.
Lines 47 and 62, "comprising;" shoud read -- comprising --.

Column 4,
Line 35, "in e.g." should read -- in, e.g., --.

Column 9,
Line 24, "In" should read -- in --.

Column 10,
Line 29, "an digital" should read -- a digital --.

Column 12,
Line 45, "apparatus" should read -- apparatus, --.

Column 14,
Line 56, "In" should read -- in --.

UNITED STATES PATENT AND TRADEMARK OFFICE
CERTIFICATE OF CORRECTION

PATENT NO. : 6,866,431 B2
DATED : March 15, 2005
INVENTOR(S) : Eriko Namazue et al.

It is certified that error appears in the above-identified patent and that said Letters Patent is hereby corrected as shown below:

Column 15,
Line 24, "inventors" should read -- inventors' --.
Line 39, "$ZrO_x$" should read -- $ZrO_2$ --.

Signed and Sealed this

Ninth Day of August, 2005

JON W. DUDAS
*Director of the United States Patent and Trademark Office*